United States Patent [19]
Clarke

[11] Patent Number: 5,483,301
[45] Date of Patent: Jan. 9, 1996

[54] OPTICAL DEVICE

[76] Inventor: Adrian M. Clarke, 1143 N. 60th Dr., Phoenix, Ariz. 85043

[21] Appl. No.: 887,873

[22] Filed: May 26, 1992

[51] Int. Cl.⁶ .............................. G02C 7/08; G02C 9/02; G02B 25/00
[52] U.S. Cl. ................ 351/41; 351/57; 351/59; 351/155; 351/158; 359/481
[58] Field of Search .................. 351/41, 57, 58, 351/59, 60, 63, 154, 155, 158; 359/481, 815, 821, 823

[56] References Cited

U.S. PATENT DOCUMENTS

| | | | |
|---|---|---|---|
| 2,459,021 | 1/1949 | Frommer | 351/59 |
| 2,978,955 | 4/1961 | Frommer | 351/57 |
| 3,945,712 | 3/1976 | Crock et al. | 351/41 |
| 4,637,696 | 1/1987 | Wilkins | 351/57 |
| 4,807,985 | 2/1989 | Feinbloom | 351/41 |
| 4,929,075 | 5/1990 | Eliakim | 351/59 |

FOREIGN PATENT DOCUMENTS 4004248  8/1990  Germany ............. 351/59

Primary Examiner—Ricky D. Shafer
Attorney, Agent, or Firm—Tod R. Nissle

[57] ABSTRACT

An optical device which is worn by a person which can be quickly adapted for use in magnifying objects distant from the person or as eyeglasses which allows a person to view objects according to their normal size and dimension. The optical device can be readily adapted for use by individuals requiring different corrective lens to compensate for poor eyesight.

5 Claims, 3 Drawing Sheets

OPTICAL DEVICE

This invention relates to an optical device.

More particularly, the invention relates to an optical device which is worn on the person and which is readily adapted for use by individuals requiring corrective lens to compensate for poor eyesight.

In another respect, the invention relates to an optical device which is worn on the person and can be quickly adapted for use in magnifying objects distant from the person or for use in viewing objects according to their normal size and dimension.

In still a further respect, the invention relates to an optical device of the type described which, while serving as eyeglasses for an individual, can be adjusted to alter the degree of magnification without requiring that the distance of the eyepiece lens from the eyes of the individual be altered.

Various kinds of binoculars are well known in the art. See, for example, U.S. Pat. Nos. 3,420,599 to Frantz et al., 4,284,325 to Ishibai et al., 3,468,596 to Alvarez, and 4,650,297 to Ishibai. Such binoculars are used in conventional fashion and require that the eyepiece lens or objective lens be adjusted and moved toward or away from the eyes of the user to alter the degree of magnification provided by the binoculars. Such prior art binoculars do not compensate for the poor vision of an individual using the binocular and cannot be adapted for ready use by individuals requiring different strengths of corrective lenses.

Accordingly, it would be highly desirable to provide an improved optical device which could be utilized to magnify objects distant from the user, which could function both as a magnifying device and as eyeglasses for individual requiring corrective lens, and which would include and permit the ready insertion and removal of corrective lens so the optical device could be adapted for use by individuals requiring different strengths of corrective lenses.

Therefore, it is a principal object of the invention to provide an improved optical device.

A further object of the instant invention is to provide an improved optical device which is adaptable for use by individuals requiring corrective lens to compensate for poor vision.

Another object of the invention is to provide an improved optical device which concurrently magnifies distant object and corrects the vision of an individual.

Still a further object of the invention is to provide an improved optical device which can be utilized to magnify distant objects or as a pair of eyeglasses which generally permit viewing of objects in their normal size, shape, and dimension.

These and other, further and more specific objects and advantages of the invention will be apparent to those skilled in the art from the following detailed description thereof, taken in conjunction with the drawings, in which.

Briefly, in accordance with my invention, I provide an optical device including a pair of optical lens; a frame for removably receiving each of the lens; attachment means for securing the frame on the head with each of the lens positioned over one of the eyes; a housing; at least one eyepiece lens mounted in the housing; means for attaching the housing to the frame and moving the housing between at least two operative positions, a first operative position with the housing a selected distance away from the frame, and a second operative position with the housing positioned a greater distance away from the frame than the selected distance; and, an objective lens mounted in the housing.

An another embodiment of the invention, I provide an optical device including a pair of corrective lens; a frame for receiving each of the lens; attachment means for securing the frame on the head with each of the lens positioned over one of the eyes; a first housing; at least one eyepiece lens mounted in the first housing; a second housing mounted on the first housing for movement between at least two operative positions, a first operative position with the second housing a selected distance away from the frame, and a second operative position with the second housing positioned a greater distance away from the frame than the selected distance; an objective lens mounted in the second housing; and, means for attaching the first housing to the frame for movement between at least two operative positions, a first operative position with each of the eyepiece lenses adjacent one of the eye lenses, and a second operative position with the eyepiece lenses moved outwardly away from the eye lens.

In still another embodiment of my invention, I provide an optical device including a pair of optical lens; a frame for receiving each of the lens; attachment means for securing the frame on the head with each of the lens positioned over one of the eyes; a first housing attached to and outwardly extending from the frame; at least one eyepiece lens mounted in the first housing; a second housing mounted on the first housing for movement between at least two operative positions, a first operative position with the second housing a selected distance away from the frame, and a second operative position with the second housing positioned a greater distance away from the frame than the selected distance; an objective lens mounted in the second housing; and, beam splitter means for splitting light which passes through said objective lens toward said frame into two beams of light each directed toward one of the eye lens. The beam splitter means is mounted in at least one of the pair comprising the first and second housings.

Figure 1:
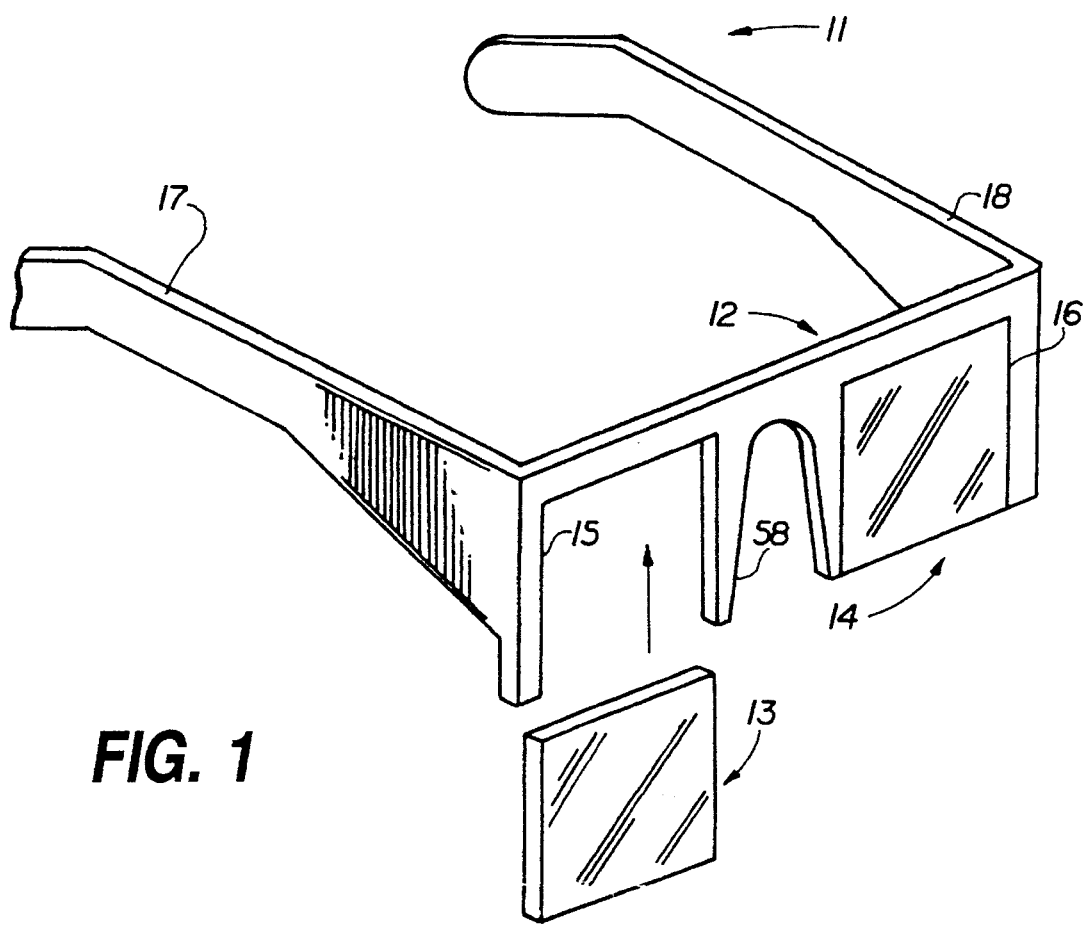
FIG. 1 is a perspective view illustrating eyeglasses constructed in accordance with the principles of the invention.

Turning now to the drawings, which depict the presently preferred embodiments of the invention for the purpose of illustrating the practice thereof and not by way of limitation of the scope of the invention, and in which like characters refers to corresponding elements throughout the several views, FIG. 1 illustrates a pair of eyeglasses constructed in accordance with the invention and generally indicated by reference character 11. Eyeglasses 11 include frame 12 and arms 17, 18 attached to and rearwardly extending from frame 12. Arms 17 and 18 extend over the ears of the user in conventional fashion. A strap or other means can be used in place of arms 17 and 18 to secure frame 12 in position on a user's head with optical lenses 13 and 14 each positioned over one of the user's eyes. U-shaped openings 15, 16 are formed in frame 12. Lens 13, 14 are shaped and dimensioned to slidably, removably snap into openings 15, 16. Opening 15 and 16 and lens 13 and 14 can be shaped and dimensioned in any fashion which permits the insertion and removal of lens 13 and 14 from openings 15 and 16. Optical lenses 13, 14 can be shaped and dimensioned to correct the vision of a user, or, if the user has 20—20 vision, can simply comprise pieces of glass or other materially which will not affect the vision of the user. The V-shaped nose rest 58 of the eyeglasses 11 can be provided with a foam or other lining which contacts the bridge of the nose of the user, helps distribute the weight of the glasses 11 over a wide surface area of the nose, and makes the eyeglasses 11 more comfortable to wear.

Figure 2:
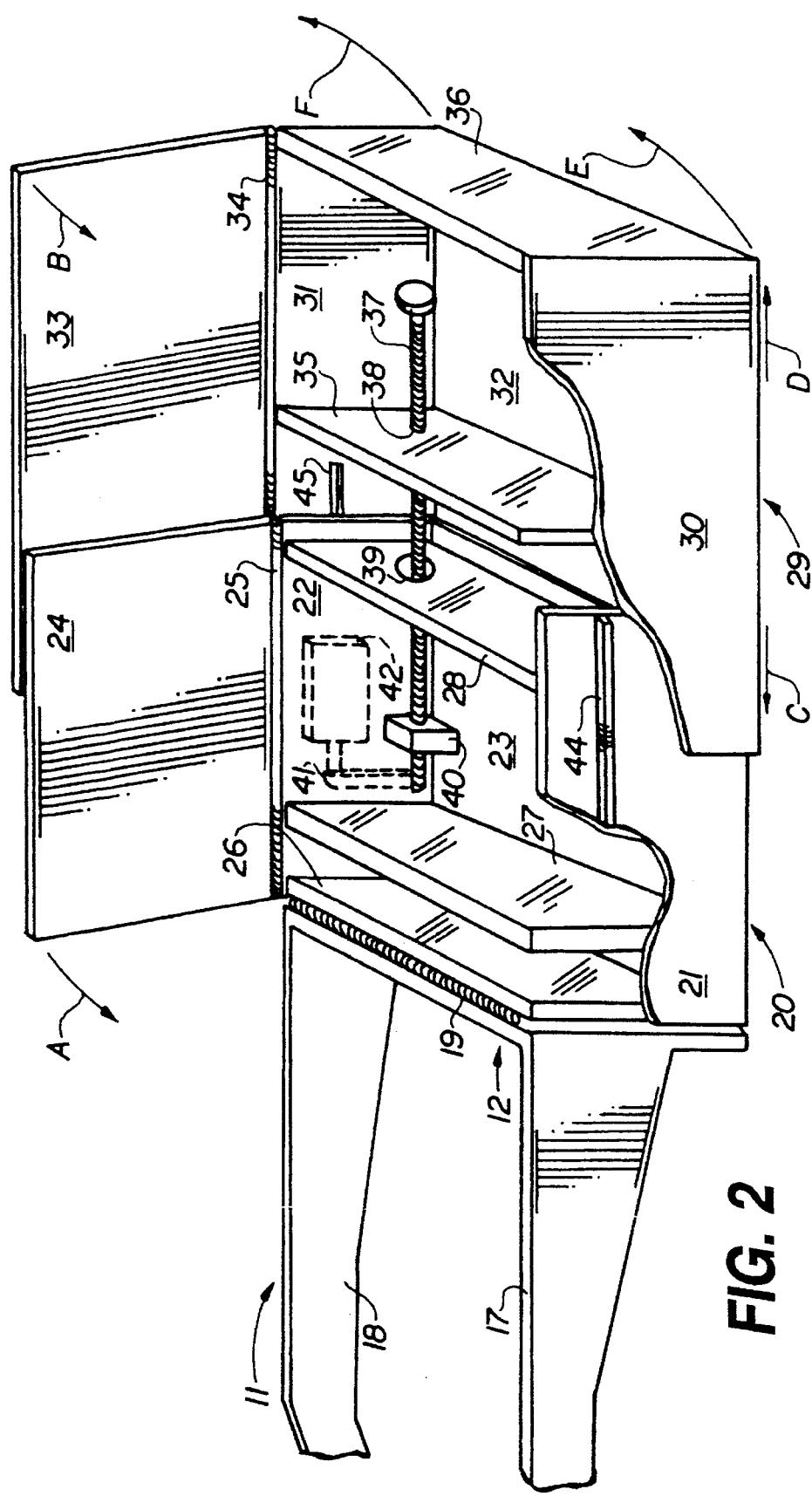
FIG. 2 is a perspective view illustrating a binocular device constructed in accordance with the invention; and, FIG. 3 is perspective view illustrating an alternate embodiment of the invention.

In FIG. 2, a binocular optical device is attached to frame 12 by hinge 19. The only points at which the binocular optical device is attached to frame 12 are along hinge 19. The binocular optical device includes a first housing 20 pivotally attached to the upper portion of frame 12 by hinge 19. Housing 20 includes side walls 21 and 22, floor 23, and lid 24 pivotally attached to the upper edge of wall 22 by hinge 25. Eyepiece lens 26 and 27 are mounted in housing 20 along with intermediate lens 28. Intermediate lens 28 can, if desired, be omitted or replaced by an optically transparent piece of material which generally does not magnify or significantly affect light passing through the piece of material. Rail 44 is attached to and outwardly extends from side wall 21. Rail 44 is slidably received by a groove 45 (not visible) formed on the inside of wall 30 of housing 29. A similar rail 44, though not visible in FIG. 2, outwardly depends from side wall 22 and is received by groove 45 formed on the inside of wall 31 of housing 29.

Housing 29 includes side walls 30 and 31, floor 32, and lid 33 pivotally attached to the upper edge of wall 31 by hinge 34. Objective lens 36 and intermediate lens 35 are mounted in housing 29. If desired, intermediate lens 35 can be omitted or replaced by an optically transparent piece of material which generally does not magnify or significantly affect light passing through the piece of material. Housing 29 can be manually slid over housing 20 in the directions indicated by arrows C and D in FIG. 2, or, the binocular optical device can be provided with an automatic drive which includes an externally threaded driven worm screw 37 which passes through an internally threaded aperture 38 formed in lens 35. When screw 37 turns in one direction, lens 35 travels along screw 37 in the direction of arrow D. When screw 37 turns in another direction, lens 35, and housing 29, moves in the direction of arrow C. Worm screw passes through, but does not contact, aperture 39 formed in lens 28. One end of worm screw 37 is rotatably secured in housing 40. Any conventional means can be used to drive screw 37, including another driven screw or gear which transmits motive power to screw 37 and including an endless belt 41 driven by a reversible motor 42. The power to drive reversible motor 42 can be provided by a small battery carried in one of housings 20 and 29, can be provided by a battery in a case which is separate from the apparatus of FIG. 2, is carried on the person, and is detachably connected to motor 42 with a cable, etc.

In use of the apparatus of FIG. 2, eyeglasses 11 are put on the user's head with arms 17 and 18 extending rearwardly from the user's face over his ears and with lens 13 and 14 each positioned over one of the user's eyes. Lids 24 and 33 are closed in the directions indicated by arrows A and B such that lids 24 and 33 contact side walls 21 and 30, respectively, and are parallel to floors 23 and 32, respectively. The user adjusts housing 29 in the directions of arrows C and D to focus or adjust the magnification of the binoculars. When the user wishes to utilize the eyeglasses 11 without the binoculars, the user grasps housing 20 or 29 and pivots the housings about hinge 19 in the direction indicated by arrows E and F to move housings 20 and 29 and the lenses carried therein from the horizontally oriented position depicted in FIG. 2 outwardly and upwardly away from lenses 13 and 14 and to a vertically oriented position out of the field of vision of the user through lens 13 and 14.

Figure 3:
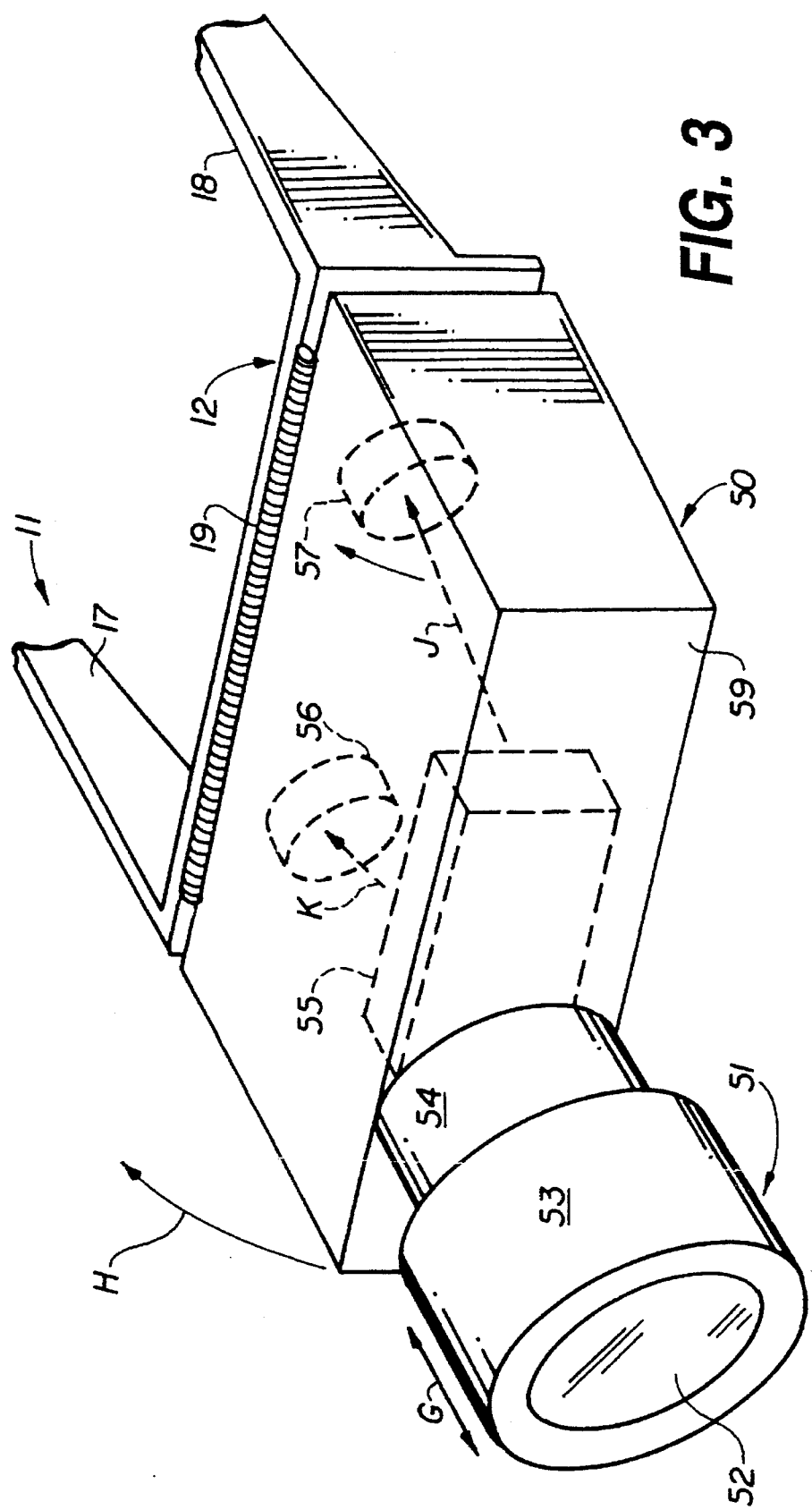

Another embodiment of the invention is depicted in FIG. 3 and includes hollow, rectangular housing 50 pivotally attached to frame 12 of eyeglasses 11 by hinge 19. The only points at which housing 50 is attached to frame 12 are along hinge 19. Eyeglasses 11 include arms 17 and 18 as earlier described. Objective lens 52 is mounted in hollow cylindrical sleeve 53 of telescoping member 51. Sleeve 53 slides over hollow cylindrical sleeve 54 of member 51 in the directions indicated by arrows G. Sleeve 53 can be manually adjusted in the directions indicated by arrows G, or a conventional worm screw drive or other system can be used to permit the mechanical or automatic adjustment of sleeve 53. Sleeve 54 is fixedly attached to housing 50 and circumscribe an opening (not visible) in housing 50. Light enters objective lens 52 in a direction of travel toward frame 12, passes through the opening (not visible) in housing 50 and enters beam splitter means 55. Various beam splitting devices, including a partially silvered mirror used in conjunction with another reflective mirror(s), are well known in the art and will not be discussed here. Means 55 produces two beams, indicated by arrows K and J, of light. One beam of light K enters eyepiece lens or lenses 56. The other beam of light enters eyepiece lens or lenses 57. The light passing through lens 57 passes through lens 14 and enters the left eye of the user. The light passing through lens 56 passes through lens 13 and enters the right eye of the user. Housing 50 and telescoping member 51 can be grasped and pivoted upwardly in the direction of arrow H to remove substantially housing 50 and member 51 from the field of view of the user through lens 13 and 14 of eyeglasses 11.

If desired, the apparatus of FIG. 3 can be modified such that components simulating a conventional pair of binoculars are mounted in housing 50. In this case, lens 52, member 51, and beam splitter 55 are removed from housing 50, a pair of objective lens are mounted in the face 59 of housing 50, and prism pairs are mounted inside housing 50 intermediate the objective lens and eyepiece lens 56 and 57. Focusing means are provided for adjusting the position of the eyepiece lens 56 and 57 so the distance between each eyepiece lens and its associated objective lens can be altered. Various types of such focusing means are well known in the art and will not be discussed here. Accordingly, after the apparatus of FIG. 3 is so modified, light entering one of the objective lens in housing 50 passes through a pair of prisms which act to invert and reverse the image. After passing through the prism pair, the light passes through one of the eyepiece lens 56 and 57, through one of lens 13 and 14, and into an eye of the user.

In the optical devices of FIGS. 2 and 3, it is important that when the housings 20, 29, 50 are in the positions illustrated, the eyepiece lens 56 and 57 are as close as possible to lens 13 and 14 without touching lens 13 and 14. Ordinarily, eyepiece lens 56 and 57 are within one-half inch, preferably within one-quarter inch or less, of the eyepiece lens 56 and 57.

If desired, housings 20, 29, 50 can be compressed so as to reduce the distance through which the housings outwardly extend from frame 12. Lenses 26, 27, 28, 35, 36, 52, 56, 57 are preferably fabricated from plastic to reduce the weight and expense of the lenses. Instead of being secured to frame 12 by a hinge 19, housings 20 and 50 can be adapted to be snapped onto frame 12, have arms which slide into and out of retainer grooves on the outer surfaces of arms 17 and 18, or may be removably attached to eyeglasses 11 in any other desired manner which permits the housings 20 and 50 to be used in the operative positions shown in FIGS. 2 and 3 and to then be moved out of the forward field of vision of the user through lens 13 and 14.

Having described my invention in such terms as to enable those skilled in the art to understand and practice it, and having described the presently preferred embodiments thereof, I claim:

1. An optical device including
   (a) a pair of lenses;
   (b) a frame for receiving each of said pair of lenses;
   (c) attachment means for securing said frame on a user's head with each of said pair of lenses positioned over one of the user's eyes;
   (d) a first housing (20);
   (e) an eyepiece lens (26) mounted in said first housing;
   (f) a second housing (29) mounted on said first housing and movable between at least two operative positions,
      (i) a first operative position with said second housing a selected distance away from said frame, and
      (ii) a second operative position with said second housing positioned a greater distance away from said frame than said selected distance;
   (g) an objective lens (36) mounted in said second housing and optically associated with said eyepiece lens;
   (h) means for pivotally attaching said first housing to said frame directly above said pair of lenses in said frame for movement between at least two operative positions,
      (i) a first operative position with said eyepiece lens closely adjacent at least one of said pair of lenses, and
      (ii) a second operative position with said housing and said eyepiece lens moved outwardly away from said pair of lenses; and,
   (i) at least one intermediate lens (28, 35) mounted on one of said first and second housings to receive light from said objective lens and direct the light received from said objective lens along a path of travel toward said eyepiece lens.

2. An optical device including
   (a) a pair of lenses;
   (b) a frame for receiving each of said pair of lenses;
   (c) attachment means for securing said frame on a user's head with each of said pair of lenses positioned over one of the user's eyes such that the user has a line of sight through said pair of lenses;
   (d) an eyepiece lens (26);
   (e) an objective lens (36);
   (f) first housing means (20) to carry said eyepiece lens;
   (g) second housing means (29) connected to said first housing means to carry said objective lens;
   (h) an intermediate lens (28) mounted on said first housing means to receive light from said objective lens and direct the light received from said objective lens along a path of travel toward said eyepiece lens;
   (i) means for altering the distance between said intermediate lens and said objective lens; and,
   (j) means for attaching said first housing to said frame for movement between at least two operative positions,
      (i) a first operative position with said eyepiece lens adjacent at least one of said pair of lenses in said frame, and
      (ii) a second operative position with said eyepiece lens moved outwardly away from said one of said pair of lenses in said frame and out of the user's line of sight through said pair of lenses in said frame.

3. The optical device of claim 2 wherein said means for attaching said first housing to said frame pivotally attaches said housing to said frame directly above said pair of lenses in said frame.

4. An optical device including
   (a) a pair of lenses;
   (b) a frame for receiving each of said pair of lenses;
   (c) attachment means for securing said frame on a user's head with each of said pair of lenses positioned over one of the user's eyes such that the user has a line of sight through said pair of lenses;
   (d) a first housing (20);
   (e) an eyepiece lens (26) mounted in said first housing;
   (f) a second housing (29) mounted on said first housing;
   (g) an objective lens (36) mounted in said second housing and optically associated with said eyepiece lens;
   (h) a first intermediate lens (35) mounted on said second housing means to receive light from said objective lens and direct the light received from said objective lens along a path of travel toward said eyepiece lens;
   (i) a second intermediate lens (28) mounted on said first housing means to receive light from said first intermediate lens and direct the light received from said first intermediate lens along a path of travel toward said eyepiece lens;
   (j) means for adjusting the position of said first intermediate lens with respect to said second intermediate lens; and,
   (k) means for attaching said first housing to said frame for movement between at least two operative positions,
      (i) a first operative position with said eyepiece lens closely adjacent at least one of said pair of lenses in said frame, and
      (ii) a second operative position with said eyepiece lenses moved outwardly away from said one of said pair of lenses in said frame and out of the user's line of sight through said pair of lenses in said frame.

5. The optical device of claim 4 wherein said means for attaching said first housing to said frame pivotally attaches said housing to said frame directly above said pair of lenses in said frame.

* * * * *